(12) United States Patent (10) Patent No.: US 8,635,229 B2
Cummings et al. (45) Date of Patent: *Jan. 21, 2014

(54) SEQUENCED QUERY PROCESSING IN DATA PROCESSING SYSTEM

(75) Inventors: David C. Cummings, Ottawa (CA); Glen M. Seeds, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,945

(22) Filed: Oct. 18, 2011

(65) Prior Publication Data

US 2013/0097188 A1 Apr. 18, 2013

(51) Int. Cl.
*G06F 17/30* (2006.01)
(52) U.S. Cl.
USPC ............................ 707/752; 707/704; 707/605
(58) Field of Classification Search
USPC ............................ 707/605, 802, 752; 703/802
See application file for complete search history.

(56) References Cited

U.S. PATENT DOCUMENTS

| | | | |
|---|---|---|---|
| 6,295,541 B1* | 9/2001 | Bodnar et al. | 1/1 |
| 6,339,768 B1 | 1/2002 | Leung et al. | |
| 6,591,266 B1* | 7/2003 | Li et al. | 1/1 |
| 6,931,418 B1 | 8/2005 | Barnes | |
| 7,552,121 B2* | 6/2009 | Barsness et al. | 1/1 |
| 7,856,458 B2 | 12/2010 | Arras et al. | |
| 2004/0034616 A1* | 2/2004 | Witkowski et al. | 707/1 |
| 2004/0111410 A1* | 6/2004 | Burgoon et al. | 707/4 |
| 2005/0144189 A1* | 6/2005 | Edwards et al. | 707/102 |
| 2010/0100558 A1* | 4/2010 | Bakalash et al. | 707/756 |
| 2010/0198777 A1 | 8/2010 | Lo et al. | |
| 2011/0131173 A1 | 6/2011 | Fernandez Ortega | |
| 2011/0131250 A1* | 6/2011 | Stolte et al. | 707/802 |
| 2011/0208690 A1* | 8/2011 | Cushing et al. | 707/602 |
| 2011/0238703 A1* | 9/2011 | Porter | 707/792 |

OTHER PUBLICATIONS

Office Action from related U.S. Appl. No. 13/614,607 dated Dec. 4, 2012 (14 pages).
Response filed Mar. 1, 2013 in U.S. Appl. No. 13/614,607, 8 pgs.
Office Action from U.S. Appl. No. 13/614,607 dated May 2, 2013 (16 pages).
Responce filed Jun. 3, 2013 to Office Action from U.S. Appl. No. 13/614,607 dated May 2, 2013 (7 pages).
Notice of Allowance from U.S. Appl. No. 13/614,607 dated Jun. 26, 2013 (11 pages).

* cited by examiner

*Primary Examiner* — Cam Truong
(74) *Attorney, Agent, or Firm* — Shumaker & Sieffert, P.A.

(57) ABSTRACT

Techniques for constructing query operations associated with a report specification are described. The query operations may include a mixture of multidimensional operations and relational operations. The application of the query operations are sequenced with the computing device to reduce or eliminate certain complexities and ambiguities during generation of reports, thereby providing an improved experience for user. For example, any multidimensional rollup operation may be applied to the multidimensional representation of the data within a first timeframe and that any aggregation operation and second level filtering are applied within a second timeframe subsequent to the first timeframe. A report may be output based on a resultant data set produced by application of the query operation in accordance with the sequencing.

12 Claims, 4 Drawing Sheets

SEQUENCED QUERY PROCESSING IN DATA PROCESSING SYSTEM

BACKGROUND

This disclosure relates to software systems, and more specifically, to report generation within enterprise software systems.

Enterprise software systems are typically sophisticated, large-scale systems that support many, e.g., hundreds or thousands, of concurrent users. Examples of enterprise software systems include inventory management systems, budget planning systems, order management systems, inventory management systems, sales force management systems, business intelligent tools, enterprise reporting tools, project and resource management systems, and other enterprise software systems.

A computing device for a user typically connects to the enterprise software system using a computing network. The user computing device may provide an operating environment for execution of an enterprise software application that may be used to generate reports for review of information, such as average product price, cost per employee, sales targets, and the like. Often, the information used to generate the reports may be stored in a relational database, a multidimensional database, or both. A reporting component of the enterprise software application typically submits one or more queries to the database to retrieve and manipulate information used to generate the reports.

While processing the queries to generate the desired report, the user may require the reporting component to perform both relational operations and multidimensional operations on the underlying data. For example, the combination of both relational operations and multidimensional operations introduces complexities and potential ambiguities into the report generation process, possibly resulting in a degraded user experience.

BRIEF SUMMARY

Techniques are described herein that allow a mixture of both relational operations and multidimensional operations to be applied to the same underlying data in a manner that may be more readily understood by user. While query processing, the techniques constrain the timing of one or more of relational operations and multidimensional operations in accordance with sequence points such that certain data operations are performed only within particular timeframes defined by the sequence points. This controlled sequencing for these fundamentally different database types of operations (constructs) may reduce or eliminate certain complexities and ambiguities, thereby providing an improved user experience. The techniques described herein may, for example, provide a simplified query processing model having fewer steps and fewer sequence points than other techniques. As such, the techniques may be easier to understand, and may more often provide expected results to the user. The techniques may allow for a generic query language that unifies relational and dimensional concepts in a simplified manner, thereby providing improved user interaction with underlying data systems.

In one example, a computer-implemented method includes configuring a computing device to perform query operations associated with a report specification. The query operations may include at least one multidimensional operation and at least one relational operation to be applied to a data cube having a plurality of dimensions, each dimension including a hierarchy of members. The method further includes sequencing the application of the query operations with the computing device by requiring that any multidimensional slicing operation to be applied to the multi-dimensional data cube and any first level relational pre-aggregation filtering operation to be applied the members of the data cube are applied within a first timeframe without allowing other ones of the query operations to be applied to the data cube. The method further includes outputting a report based on a resultant data set produced by application of the query operation in accordance with the sequencing.

In another example, a computer-readable storage medium is encoded with instructions that, when executed, cause one or more processors of a computing device to configure a computing device to construct a query in response to a report specification, wherein the query comprises a set of query operations that include at least one multidimensional operation and at least one relational operation to be applied to a multidimensional data cube having a plurality of dimensions, each dimension including a hierarchy of members. The computer-readable storage medium is further encoded with instructions that, when executed, cause the one or more processors of the computing device to sequence the application of the query operations query with the computing device by requiring that any multidimensional slicing operation to be applied to the multi-dimensional data cube and any first level relational pre-aggregation filtering operation to be applied the members of the data cube are applied within a first timeframe without allowing other ones of the query operations to be applied to the data cube. The computer-readable storage medium is further encoded with instructions that, when executed, cause the one or more processors of the computing device to output a report based on a resultant data set produced by application of the query operation in accordance with the sequencing.

In another example, a computing device includes one or more processors, and a report engine, executable by the one or more to perform query operations associated with a report specification. The query operations may include at least one multidimensional operation and at least one relational operation to be applied to multidimensional data cube having a plurality of dimensions, each dimension including a hierarchy of members. The computing device further includes a sequencing module, executable by the one or more processors to sequence the application of the query operations with the report engine by requiring that any multidimensional slicing operation to be applied to the multi-dimensional data cube and any first level relational pre-aggregation filtering operation to be applied the members of the data cube are applied within a first timeframe without allowing other ones of the query operations to be applied to the data cube. The report engine may be further executable by the one or more processors to output a report based on the report data set.

The details of one or more aspects of this disclosure are set forth in the accompanying drawings and the description below. Other features, objects, and advantages of the disclosure will be apparent from the description and drawings, and from the claims.

DETAILED DESCRIPTION

Techniques are described herein in which query processing and, in particular, application of both relational operations and multi-dimensional operations during report generation is controlled through particular sequence points. This controlled sequencing for these fundamentally different database types of operations (constructs) may reduce or eliminate certain complexities and ambiguities, thereby providing an improved user experience. The techniques described herein may, for example, provide a simplified query processing model having fewer steps and fewer sequence points than other techniques. As such, the techniques may be easier to understand, and may more often provide expected results to the user. The techniques may allow for a generic query language that unifies relational and dimensional concepts in a simplified manner, thereby providing improved user interaction with underlying data systems.

Figure 1:
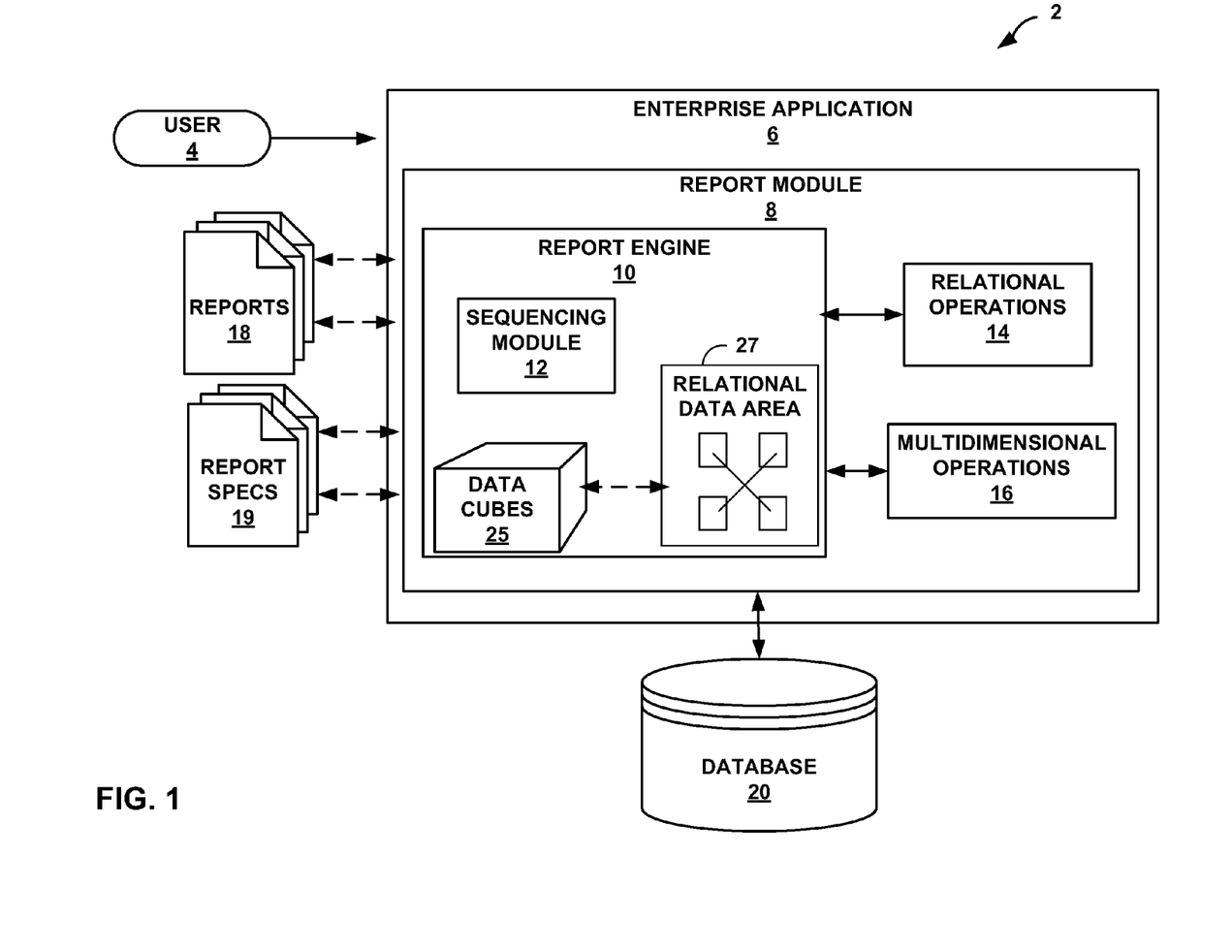
FIG. 1 is a block diagram illustrating an example enterprise software system for generating a report using data retrieved from a database, in accordance with one or more aspects of this disclosure.

FIG. 1 is a block diagram of an example computing system 2 in which an enterprise application 6 includes a report module 8 that provides controlled sequencing of query processing to apply both relational and multidimensional operations when generating reports 18. Although described for exemplary purposes with respect to enterprise application 6, the techniques described herein may be applied to any software system that performs relational and multidimensional operations to manipulate underlying data and construct reports, either in response to user input or pre-defined report specifications 19. In the example of FIG. 1, enterprise application 6 may be any software application that manipulates and processes underlying data from database 20. In this example, enterprise application 6 may be a suite of business intelligence software tools or performance management and enterprise planning systems, such as an enterprise-wide financial management system or budget planning system. The techniques described herein may be readily applied to other software systems, including other large-scale enterprise software systems. Examples of enterprise software systems include order management systems, inventory management systems, sales force management systems, business intelligent tools, enterprise reporting tools, project and resource management systems and other enterprise software systems.

In the example system shown in FIG. 1, user 4 interacts with enterprise application 6 to generate reports 18. Enterprise application 6 may include a suite of tools that may enable user 4 to contribute, retrieve, analyze, and visualize enterprise information, such as product price, product sale, projected sales of a product, and the like. For example, enterprise application 6 may include reporting tools, modeling tools, spreadsheet applications, data collection templates, business intelligence tools, or other types of enterprise application tools.

In the example of FIG. 1, enterprise application 6 includes report module 8 that allows user 4 to retrieve information from database 20 to generate reports 18. Report module 8 may provide a user interface to enable user 4 to specify information to be retrieved. For example, user 4 may specify parameters relating to cost data for a particular product line for a particular year, parameters relating to projected sales of a product, and the like. During this process, user 4 may direct report engine 10 to construct one or more queries to be processed and issued to database 20, and may retrieve the specified information based on the query. In one example, report module 8 may create a report 18 for user 4 based on one or more report specifications 19. Report specifications 19 may be simpler to create for certain users than detailed, individual queries. That is, users with less technical knowledge than typically required to compose database queries may nevertheless be able to create report specifications 19 by interacting with a user interface presented by report module 8. Report specification 19 may be written in a reporting language that hides intricacies of a query language (e.g., MDX). Moreover, report module 8 may support a reporting language that unifies both relational operations 14 and multidimensional operations 16 without requiring that the user be familiar with the intricacies of the differing underlying data representations.

As illustrated in FIG. 1, report engine 10 includes sequencing module 12 that provides fine-grain sequencing for query processing when generation of a report 18 requires application of both relational operations 14 and multidimensional operations 16. For instance, sequencing module 12 controls the timing and order of operations available to user 4 when mixing relational operations 14 and multidimensional operations 16 on data retrieved from database 20 to produce one or more intermediate results during the report generation process.

Typically, relational operations 14 are more suited to reporting data in relational form (relational data area 27) than to analyzing dimensionally-organized data (data cubes 25). Relational operations 14 may, for example, typically process relationally-organized data 27 by: (i) computing a projection from data; (ii) performing a first level of filtering (e.g., by applying an SQL WHERE clause) on the projected data; (iii) aggregating the filtered data (e.g., by applying SQL GROUP BY clause); and (iv) performing a second level of filtering (e.g., by applying an SQL HAVING clause) on the aggregated data. Further, when generating a report 18, results from executing a first relational query may act as input to a second relational query. In contrast, multi-dimensional operations 16 are more suited to analyzing dimensionally-organized data 25 than to reporting relationally-organized data. Multidimensional operations 16 may be used to define a section of a multi-dimensional cube by specifying the desired members or tuples of each edge and then retrieving (and/or computing) values from corresponding cells in the cube. In contrast to relational operations 14, multidimensional operations 16 typically processes data as follows: (i) applying a slicer to a cube (e.g., by applying an MDX WHERE clause); (ii) computing members and tuples on each edge of the cube—for example, the multidimensional DBMS applies set operations such as filter, top, bottom, etc., (e.g., MDX edge specification); and (iii) retrieving cell values at intersections of the cube defined by qualified tuples along each edge of the cube. Further exemplary details are described in U.S. patent application Ser. No. 12/711,562, entitled "VIEWING AN OLAP CUBE AS A VIRTUAL DATA SOURCE," the entire contents of which are incorporated herein by reference.

In accordance with the techniques described herein, either of relational operations 14 or multidimensional operations 16 may be applied to either a multidimensional representation or relational representation of data retrieved from database 20.

For example, report module 8 may apply relational operations 14 to relationally-organized data 27 or directly to members within data cubes 25. In this way, the techniques described herein allow a mixture of both relational operations 14 and multidimensional operations 16 to be applied to the same underlying data and, as described, in a manner that may be more readily understood by user 4.

As such, user 4 may construct report specifications or otherwise direct report module 8 to apply a variety of relational operations 14 (e.g., detail filters, table join operations, projections, auto-group and summarize operations, explicit pre-summary-filter summaries, group body detail operations, explicit summaries, and group sort operations) and a variety of multidimensional operations 16 (e.g., slicing operations, cubing operations, member rollups, set, aggregation, projections, and suppressions. Initially, report engine 10 may extract data from underlying multidimensional database 20 (which may be in a relational, multidimensional or other type of database), and may construct dimensionally-organized representation 25 and optionally construct relational data area 27. While manipulating the data in accordance with report specifications 19, report engine 10 may generate one or more queries against database 20, data cubes 25 or relational data area 27 to retrieve, process and compute the required information. For instance, user 4 may specify cost data for a particular product line for a particular year. Report engine 10 may submit one or more queries, such as one or more structure query language (SQL) queries, to process data, typically organized within one or more relational tables. Similarly, report engine 10 may submit one or more queries, such as multidimensional expressions (MDX) queries, to retrieve and process multidimensional information. As another example, report engine 10 may apply one or more of relational operations 14 to relational data area 27, data cubes 25, or both.

In such an example, the information specified by user 4 (e.g., cost data for a particular product line for a particular year) may be extracted from database 20. As such, report engine 10 may retrieve information and represent the data in the form of one or more tables within relational data area 27 or one or more multidimensional data cubes 25. In other embodiments, data cubes 25 and/or relational data area 27 may be maintained within database 20.

While processing input from user 4 or a report specification 19, sequencing module 12 provides a fine degree of control of the order and timing in which any requested relational operations 14 and multidimensional operations 16 are applied. For example, sequencing module 12 may define one or more sequence points with respect to relational operations 14 and multidimensional operations 16. Sequencing module 12 constrains the timing of one or more of relational operations 14 and multidimensional operations 16 in accordance with the sequence points such that certain operations are performed only within particular timeframes defined by the sequence points. Operations within a timeframe may be allowed to be applied independently (e.g., in any order) but without application of operations that are designated for application within other timeframes.

For instance, sequencing module 12 may define a first sequence point after data is retrieved from database 20, and a second sequence point after both pre-aggregation filtering (e.g., as included in relational operations 14) and slicing operations (e.g., as included in multidimensional operations 16) are performed. In other words, in this example, sequencing module 12 may constrain the application of any pre-aggregation relation operation 14 and any slicing multidimensional operation 14 such that the operations are applied in the same timeframe prior to providing any resultant data to user 4 or otherwise allowing additional operations to be applied. In this sense, any pre-aggregation relation operation 14 and any slicing multidimensional operation 14 may be viewed as a single "atomic" operation within the query processing technique enforced by sequencing module 12. In another example, sequencing module 12 may define and enforce sequence points to require that any rollup and set operations via multidimensional operations 16 are applied prior to any aggregation and second level filtering of the aggregated data via relational operations 14. This controlled sequencing for applying relational operations 14 and multidimensional operations to relational data area 27 and data cubes 25 may reduce or eliminate certain complexities and ambiguities during generation of reports 18, thereby providing an improved experience for user 4.

Figure 2:
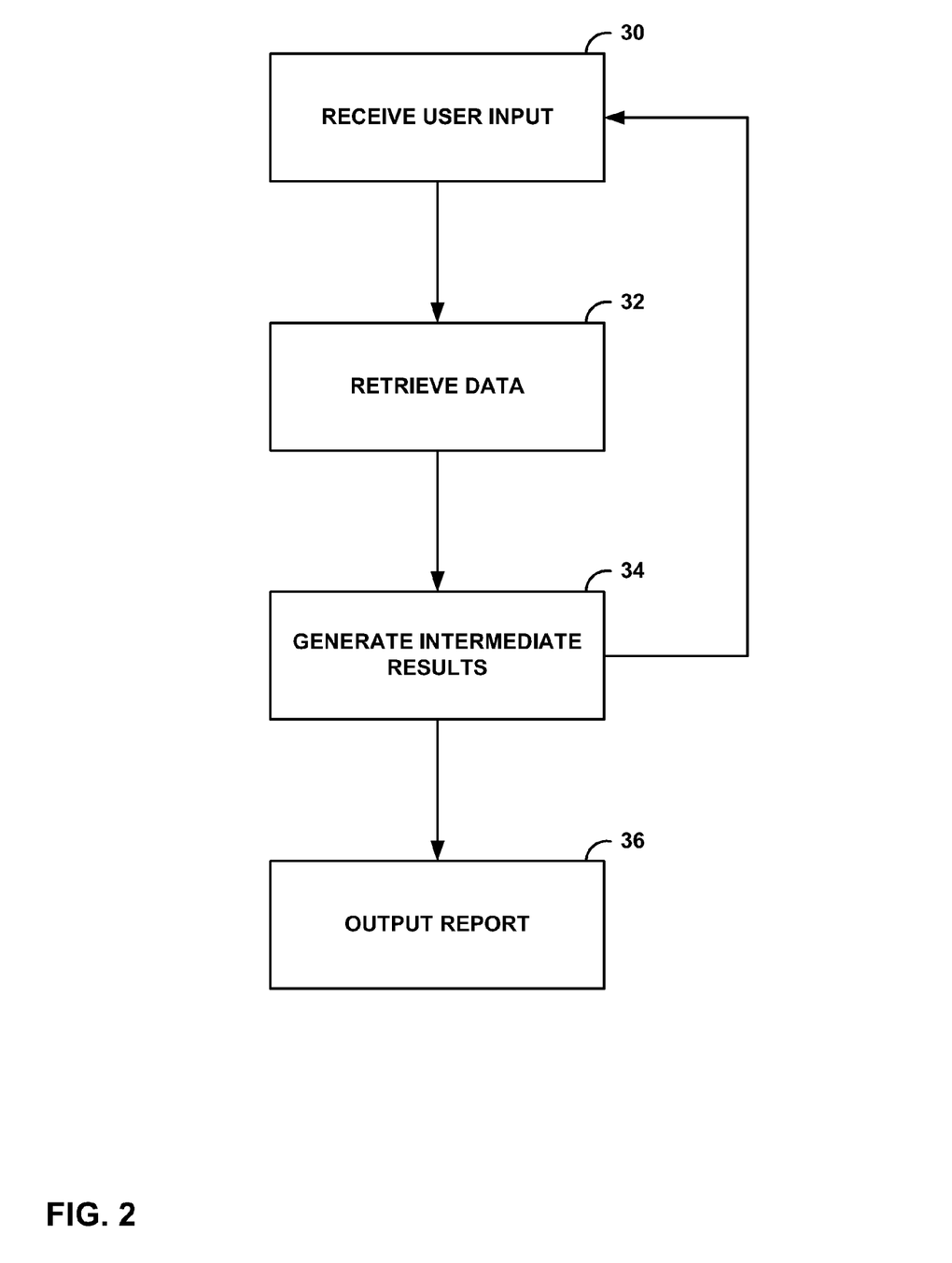
FIG. 2 is a flow diagram illustrating an example operation of an enterprise application for generating a report using data retrieved from a database, in accordance with one or more aspects of this disclosure.

FIG. 2 is a flow diagram illustrating an example operation of an enterprise application 6 for generating a report using data retrieved from database 20, in accordance with one or more aspects of this disclosure. Report module 8 may receive a user input specifying information to be retrieved from database 20 (30). As an example, report module 8 may provide a user interface enabling user 4 to specify information to be retrieved (e.g., cost data for a particular product line for a particular year). At this time, user 4 may select a report specification 19. Report engine 10 may initially retrieve data from database 20 and manipulate the data in relational form (relational data area 27) and multidimensional form (data cubes 25) depending upon the particular operations 14, 16 being applied (32). For instance, to retrieve the specified information, report engine 10 may process a selected report specification 19 (potentially written in a generic query language) to dynamically construct and submit one or more SQL queries to relational data area 27 and one or more MDX queries to data cubes 25 to compute and manipulate intermediate results (34) and ultimately produce reports 19 (36). As another example, report engine 10 may dynamically construct and submit one or more relational operations 14 to data cubes 25 to compute and manipulate intermediate results.

Figure 3:
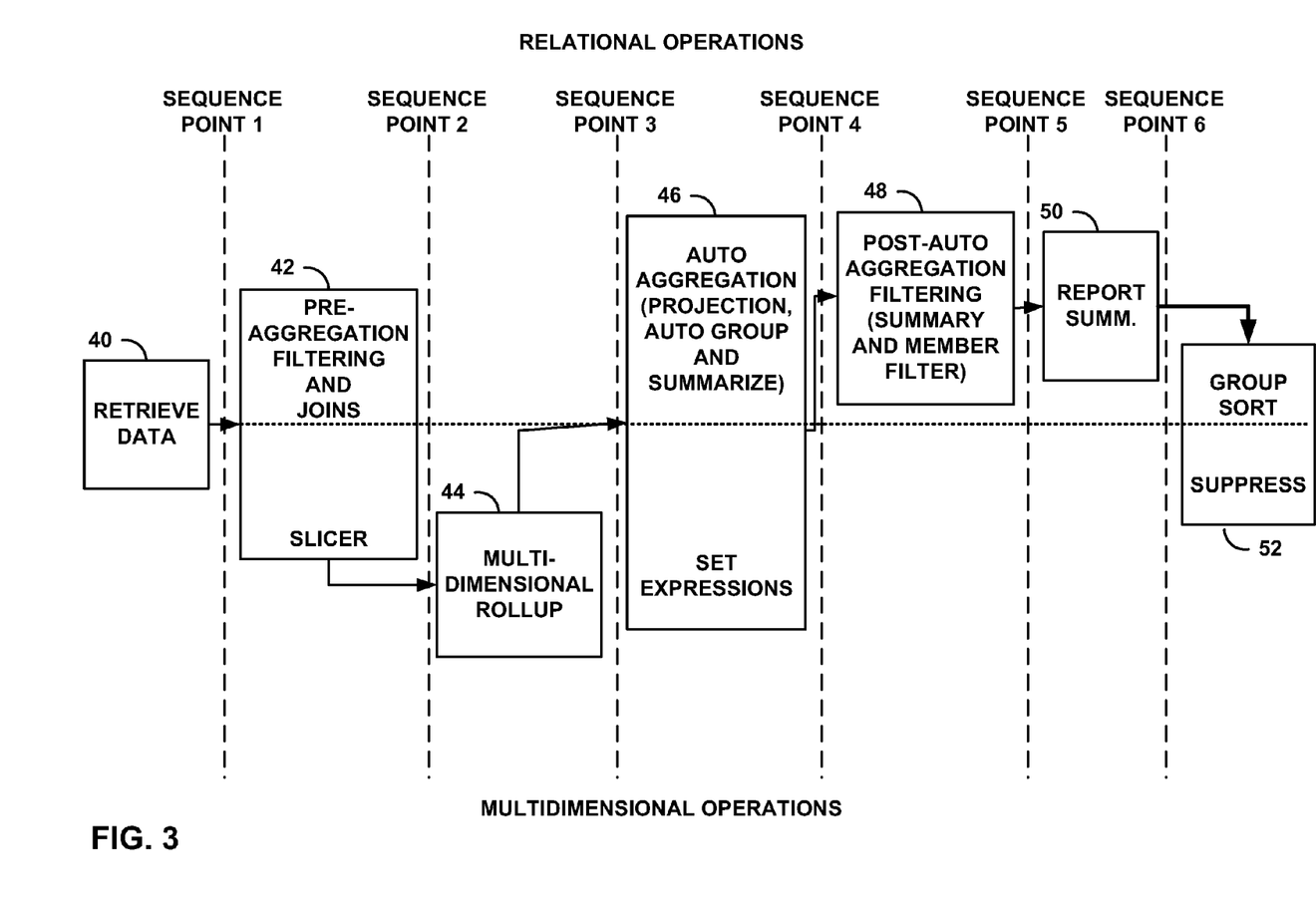
FIG. 3 is a timing diagram illustrating an example operation of an enterprise application for generating a report using data retrieved from a database, in accordance with one or more aspects of this disclosure.

FIG. 3 is a timing diagram illustrating an example operation of an enterprise application 6 for generating a report using data retrieved from database 20, in accordance with one or more aspects of this disclosure. In the example of FIG. 3, sequencing module 3 defines six sequence points (illustrated as sequence points 1-6), each of the sequence points defining a timeframe within which one or more of relational operations 14 or multidimensional operations 16 are performed. Sequencing module 12 constrains the application of relational operations 14 and multidimensional operations 16 in accordance with the defined sequence points. In some examples, As illustrated in FIG. 3, sequencing module 12 defines a first sequence point after data is retrieved from database 20. Report engine 10 may initially retrieve data from database 20 for further processing and refinement with relational operations and multidimensional operations (40). For example, while processing a query set forth in a report specification 19, report engine 10 may construct and submit one or more SQL queries or one or more MDX queries to process data organized within relational data area 27 or data cubes 25. Again, although shown separately from database 20, multidimensional data cubes 25 and relational data area 27 may exist within database 20 and may be modified during query processing for report generation.

As shown in the example of FIG. 3, sequencing module 12 defines a first sequence point (sequence point 1 as illustrated in FIG. 3) after data has been retrieved from database 20. Sequencing module 12 may constrain the timing of the retrieval of data from database 20 such that report engine 10 submits the one or more queries to retrieve data from database 20 within the timeframe prior to sequence point 1.

Report engine 10 may apply a first level of pre-aggregation filtering and table join commands and one or more multidimensional slicing operations to relational data area 27 or data cubes 25 during the single timeframe defined by sequence points one and two (42). For example, report engine 10 may apply a pre-aggregation detail filter (e.g., corresponding to an SQL WHERE clause) to relational data 27, such as to exclude one or more rows of data organized within one or more tables of relational data 27. As another example, report engine 10 may apply one or more pre-aggregation relational operations, such as one or more member filters, to multidimensional members of data cubes 25. Similarly, report engine 10 may apply a slicing operation (e.g., corresponding to an MDX WHERE clause) to multidimensional data cubes 25 to define a subset of the overall dimensional space of data cubes 25 to which other query constructs are applied.

Sequencing module 12 defines a second sequence point (illustrated as sequence point 2) after the pre-aggregation filtering and multidimensional slicing operations have been applied. Sequencing module 12 constrains the timing of the pre-aggregation filtering and multidimensional slicing operations to the timeframe between sequence point 1 and sequence point 2, thereby ensuring that the pre-aggregation filtering and multidimensional slicing operations are applied concurrently from the user's perspective, i.e., within the same timeframe (i.e., the timeframe between sequence point 1 and sequence point 2). As such, operations may be viewed as a single "atomic" operation within the query processing technique enforced by sequencing module 12.

Next, report engine 10 may apply one or more multidimensional rollup operations to multidimensional data cubes 25 (44). For instance, report engine 10 may compute members and tuples on each edge of a data cube 25 (e.g., by applying set operations such as filter, top, bottom, and the like), and may retrieve cell values at intersections of the cube defined by qualified tuples along each edge of the cube. In certain examples, the cell values may not be contained in the data cube 25, but rather may be computed based on values within the cube. For instance, report engine 10 may apply a member rollup operation to data cubes 25 that is configured to sum data of one or more dimensions of data cubes 25.

Sequencing module 12 defines a third sequence point after the one or more multidimensional rollup operations have been applied and before any set expressions and aggregation operations are applied. Sequencing module 12 constrains the operation of the query processing technique such that any multidimensional rollup operations (e.g., as included in multidimensional operations 16) are applied in the timeframe after sequence point 2 and prior to sequence point 3. As such, sequencing module 12 ensures that that any multidimensional rollup operations are performed after any pre-aggregation filtering and slicing operations, but before any set expressions and aggregation operations.

Report engine 10 then allows any set expressions and aggregation operations to relational data area 27 or data cubes 25 (46). For example, report engine 10 may apply one or more projection operations to extract specified attributes from a tuple or set of tuples. Report engine 10 may apply one or more set expressions, which may be evaluated in a context that includes the projection. For instance, if the set expression "top three cities by revenue" is nested under countries, then the result may contain the top three cities for each projected country (e.g., Canada, the United States, etc.). The set expressions may be correlated with what is nested below them on the same edge, such as to be consistent with relational inner join semantics that may have been applied with respect to operation 42. For instance, a report specification may start with all countries, and may project a subset of all cities nested below the countries. In such an example, the result may contain only those countries corresponding to the projected cities. Report engine 10 may apply one or more aggregation operations, such as one or more auto-group and summarize operations.

Sequencing module 12 constrains the operation of the query processing technique such that the set expressions and aggregation operations (e.g., auto-group and summarize operations) are applied in the same timeframe (i.e., a timeframe after sequence point 3 and before sequence point 4) prior to providing any resultant data to user 4 or otherwise allowing additional operations to be applied. In this sense, any aggregation operations and set expression operations may be viewed as a single "atomic" operation within the query processing technique enforced by sequencing module 12.

Next, report engine 10 allows post-aggregation filtering (e.g., summary filters, summary-for expressions, and any member filters) to relationally-organized data area 27 or multidimensional data cubes 25 after sequence point 4, but before sequence point 5 (48). For instance, report engine 10 may apply one or more member filters to multidimensional members of data cubes 25. Next, report engine 10 may apply any relational summaries and report summaries ("REPORT SUMM." in FIG. 3) (e.g., header, footer, and detail summaries) to one or more of relational data area 27 or data cubes 25 in a timeframe after sequence point 5 but before sequence point 6 (50). Report engine 10 may apply any relational group sorting operations and any dimensional suppression operations after sequence point 6 (52).

As illustrated in the example of FIG. 3, sequencing module 12 controls the timing and order of operations available to a user when mixing relational operations 14 and multidimensional operations 16 on data retrieved from database 20 to produce one or more intermediate results during the report generation process. The controlled sequencing of relational operations 14 and multidimensional operations 16 in accordance with defined sequence points may reduce or eliminate certain complexities and ambiguities during generation of reports 18, thereby providing an improved experience for the user. In some example, one or more of the group of operations 40, 42, 44, 46, 48, 50 and 52 may be skipped depending upon the particular requirements of the query being processed. In this case, sequencing module 12 proceeds to the subsequent set of operations shown within the timing diagram of FIG. 3 and processing continues in accordance with the sequence constraints set forth herein.

Figure 4:
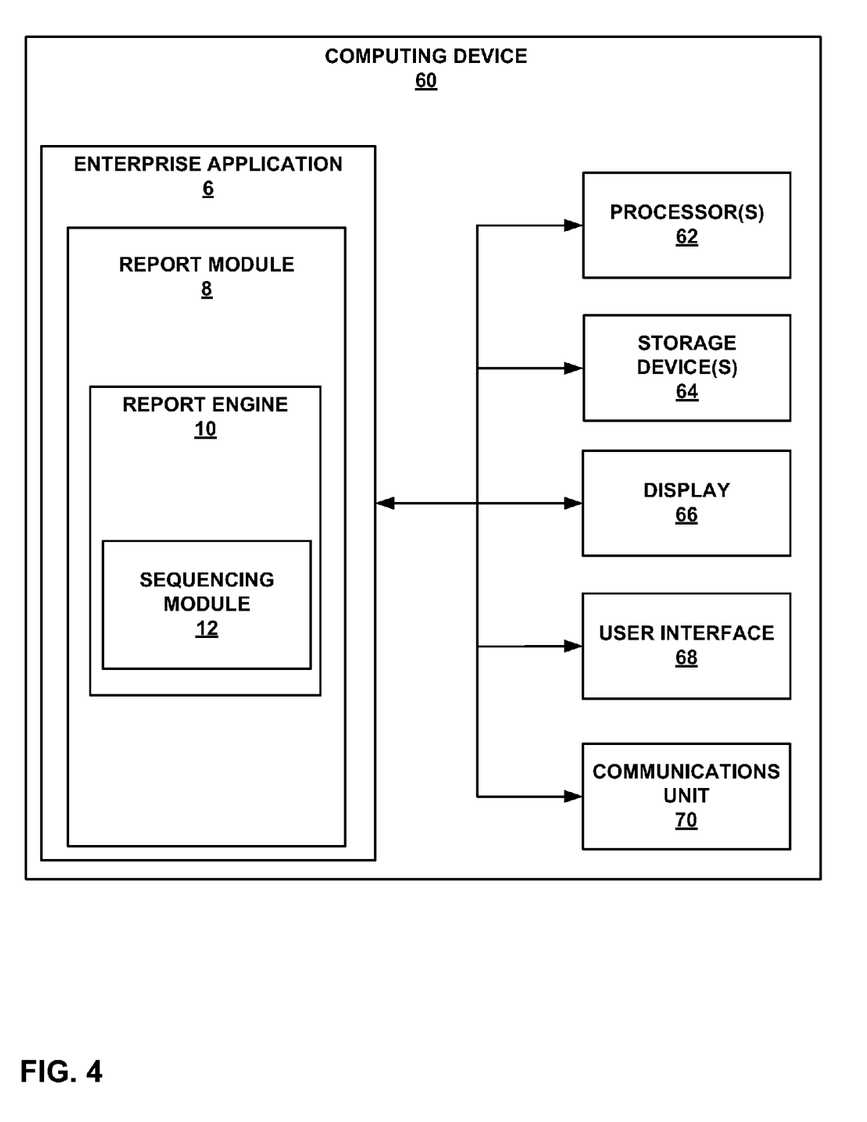
FIG. 4 is a block diagram illustrating an example computing device for generating a report using data retrieved from a database, in accordance with one or more aspects of this disclosure.

FIG. 4 is a block diagram illustrating an example computing device 60 for generating a report using data retrieved from a database, in accordance with one or more aspects of this disclosure. As illustrated in FIG. 4, computing device 60 may include enterprise application 6, one or more processors 62, one or more storage devices 64, display 66, user interface 68, and communications unit 70. Enterprise application 6 may include report module 8. Report module 8 may include report engine 10, which may include sequencing module 12.

Computing device 60, in some examples, may include or be a part of an application server, database server, workstation, or other computing system. Computer device 60 may also be a portable computing device (e.g., a mobile phone, netbook, laptop, personal digital assistant (PDA), tablet device, and the like), desktop computer, or server. Computing device 60 may include additional components not shown in FIG. 4 for clarity. For example, if computing device 60 comprises a mobile computing device, computing device 60 may include a battery to provide power to the components of computing device 60.

Although shown as separate components in FIG. 4, in some examples, one or more of enterprise application 6, report module 8, report engine 10, and sequencing module 12 may be part of the same module. In some examples, one or more of enterprise application 6, report module 8, report engine 10, sequencing module 12, and one or more processors 62 may be formed in a common hardware unit. In certain examples, one or more of enterprise application 6, report module 8, report engine 10, and sequencing module 12 may be software and/or firmware units that are executed on or operable by one or more processors 62 to perform various techniques of this disclosure.

One or more processors 62 may include, in certain examples, any one or more of a microprocessor, a controller, a digital signal processor (DSP), an application specific integrated circuit (ASIC), a field-programmable gate array (FPGA), or equivalent discrete or integrated logic circuitry. In some examples, one or more storage devices 64 may store one or more instructions that cause one or more processors 62, enterprise application 6, and modules 8, 10, and 12 to perform various functions ascribed to one or more processors 62, enterprise application 6, and modules 8, 10, and 12.

One or more storage devices 64 may include any form of machine- or computer-readable media. For example, one or more storage devices 64 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

Display 66 may be a liquid crystal display (LCD), e-ink, organic light emitting diode (OLED), or other display. Display 66 may present the content of computing device 60 to a user. For example, display 66 may present a graphical user interface, a web browser, or other functions that may need to be presented to a user. In some examples, display 66 may be a touch screen that can allow a user to interact with the computing device 60.

User interface 68 may allow a user of computing device 60 to interact with computing device 60. Examples of user interface 68 may include, but are not limited to, a keypad embedded on computing device 60, a keyboard, a mouse, a roller ball, buttons, a touch screen, a graphical user interface, or other devices that allow a user to interact with computing device 60. In some examples, display 66 may present some or all of the functionality of user interface 68. For instance, display 66 may be a touch screen that can present a graphical user interface to allow a user to interact with computing device 60.

Communications unit 70 may provide for communications with other data processing systems or devices. For instance, communications unit 70 may be a network interface card. Communications unit 70 may provide communications through the use of either or both physical and wireless communications links.

Enterprise application 6 may be a suite of business intelligence software tools or performance management and enterprise planning systems, such as an enterprise-wide financial management system or budget planning system. Enterprise application 6 may enable user 4 to contribute, retrieve, analyze, and visualize enterprise information, such as product price, product sale, projected sales of a product, and the like. For example, enterprise application 6 may include reporting tools, modeling tools, spreadsheet applications, data collection templates, business intelligence tools, or other types of enterprise application tools.

In the example of FIG. 4, enterprise application 6 includes report module 8. Report module 8, executing on one or more processors 62, may cause display 66 to display a user interface enabling a user to retrieve information from a database (e.g., database 20). Report engine 10 may generate one or more queries to be submitted to database 20 (e.g., one or more MDX queries, one or more SQL queries, and the like) to retrieve the specified information. In some examples, report engine 10 may submit a generated query to another data processing systems or device using communications unit 70.

Report engine 10 includes sequencing module 12 that provides fine-grain sequencing for query processing when generation of a report (e.g., reports 18) requires application of both relational operations (e.g., relational operations 14) and multidimensional operations (e.g., multidimensional operations 16). For instance, sequencing module 12 controls the timing and order of operations available to a user (e.g., user 4) when mixing relational operations and multidimensional operations on data retrieved from a database to produce intermediate results during the report generation process.

Sequencing module 12 may control the sequence and timing of relational operations 14 and multidimensional operations 16 in accordance with the examples discussed above with respect to FIGS. 1-3. Report engine 10 may generate one or more reports (e.g., reports 18) based on data retrieved from database 20, relational database 22, and intermediate results produced by the application of relational operations 14 and multidimensional operations 16.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other aspects are within the scope of the following claims.

The invention claimed is:

1. A computer-readable storage memory encoded with instructions that, when executed, cause one or more processors of a computing device to:
   configure the computing device to construct a query in response to a report specification, wherein the query comprises a set of query operations that include at least one multidimensional and at least one relational operation to be applied to a multidimensional data cube having a plurality of dimensions, each dimension including a hierarchy of members;
   sequence the application of the query operations with the computing device by requiring that:
      (i) multidimensional slicing operations to be applied to the data cube and first level relational pre-aggregation filtering operations to be applied to the members of the data cube are applied within a first timeframe without allowing other ones of the query operations to be applied to the data cube within the first timeframe,
      (ii) multidimensional rollup operations are applied to the multidimensional data cube within a second timeframe subsequent to the first timeframe, and
      (iii) second level relational post auto aggregation filtering operations are applied to the relational representation of the data within a third timeframe subsequent to the second timeframe; and
   output a report based on a resultant data set produced by the application of the query operations in accordance with the sequencing.

2. The computer-readable storage memory of claim 1, wherein the first level relational pre-aggregation filtering operations and multidimensional slicing operations form a single "atomic" operation within the query with respect to the other ones of the query operations.

3. The computer-readable storage memory of claim 1, further comprising instructions that, when executed, cause the one or more processors of the computing device to further sequence the application of the query operations by requiring relational auto aggregation operations are applied to the members of the data cube after the multidimensional rollup operations are applied to the multidimensional data cube and prior to the application of the relational post auto aggregation filtering operations to the relational representation of the data.

4. The computer-readable storage memory of claim 3, further comprising instructions that, when executed, cause the one or more processors of the computing device to:
   apply at least one second level relational post auto aggregation filtering operation to the relational representation of the data within a fourth timeframe subsequent to the third timeframe.

5. The computer-readable storage memory of claim 4, further comprising instructions that, when executed, cause the one or more processors of the computing device to:
   apply at least one relational summary operation or report summary operation to the data cube within the member of the data cube within a fifth timeframe subsequent to the fourth timeframe.

6. The computer-readable storage memory of claim 5, further comprising instructions that, when executed, cause the one or more processors of the computing device to:
   apply at least one relational group sort operation or at least one multi-dimensional suppression operation to the data cube within the sixth timeframe subsequent to the fifth timeframe.

7. A computing device, comprising:
   one or more processors;
   a report engine, executable by the one or more processors to perform query operations associated with a report specification, wherein the query operations include at least one multidimensional operation and at least one relational operation to be applied to a data cube having a plurality of dimensions, each dimension including a hierarchy of members; and
   a sequencing module, executable by the one or more processors to sequence the application of the query operations with the report engine by requiring that:
      (i) multidimensional slicing operations to be applied to the data cube and first level relational pre-aggregation filtering operations to be applied to the members of the data cube are applied within a first timeframe without allowing other ones of the query operations to be applied to the data cube within the first timeframe,
      (ii) multidimensional rollup operations are applied to the multidimensional data cube within a second timeframe subsequent to the first timeframe, and
      (iii) second level relational post auto aggregation filtering operations are applied to the relational representation of the data within a third timeframe subsequent to the second timeframe,
   wherein the report engine is further executable by the one or more processors to output a report based on a resultant data set produced by the application of the query operations in accordance with the sequencing.

8. The computing device of claim 7, wherein the first level relational pre-aggregation filtering operations and multidimensional slicing operations form a single "atomic" operation within the query with respect to the other query operations.

9. The computing device of claim 8, wherein the sequencing module is further executable by the one or more processors to further sequence the application of the query operations by requiring that relational auto aggregation operations are applied to the members of the data cube after the multidimensional rollup operations are applied to the multidimensional data cube and prior to the application of the relational post auto aggregation filtering operations to the relational representation of the data.

10. The computing device of claim 9, wherein the report engine is further executable by the one or more processors to apply at least one relational post auto aggregation filtering operation to members of the data cube within a fourth timeframe subsequent to the third timeframe.

11. The computing device of claim 10, wherein the report engine is further executable by the one or more processors to apply at least one relational summary of report summary operation within a fifth timeframe subsequent to the fourth timeframe.

12. The computing device of claim 11, wherein the report engine is further executable by the one or more processors to apply at least one relational group sort operation or at least one multidimensional suppression operation within a sixth timeframe subsequent to the fifth timeframe.

* * * * *